W. G. WOOD.
PNEUMATIC SUPPORT FOR VEHICLES.
APPLICATION FILED APR. 15, 1916.

1,284,530.

Patented Nov. 12, 1918.

Inventor,
William G. Wood,
per J. M. Wright,
Attorney,

UNITED STATES PATENT OFFICE.

WILLIAM G. WOOD, OF SACRAMENTO, CALIFORNIA.

PNEUMATIC SUPPORT FOR VEHICLES.

1,284,530.  Specification of Letters Patent.  Patented Nov. 12, 1918.

Application filed April 15, 1916. Serial No. 91,467.

*To all whom it may concern:*

Be it known that I, WILLIAM G. WOOD, a citizen of the United States, residing at Sacramento, in the county of Sacramento and State of California, have invented new and useful Improvements in Pneumatic Supports for Vehicles, of which the following is a specification.

The object of the present invention is to provide an improved pneumatic support for the bodies of vehicles, such as motor cars.

Figure 1:
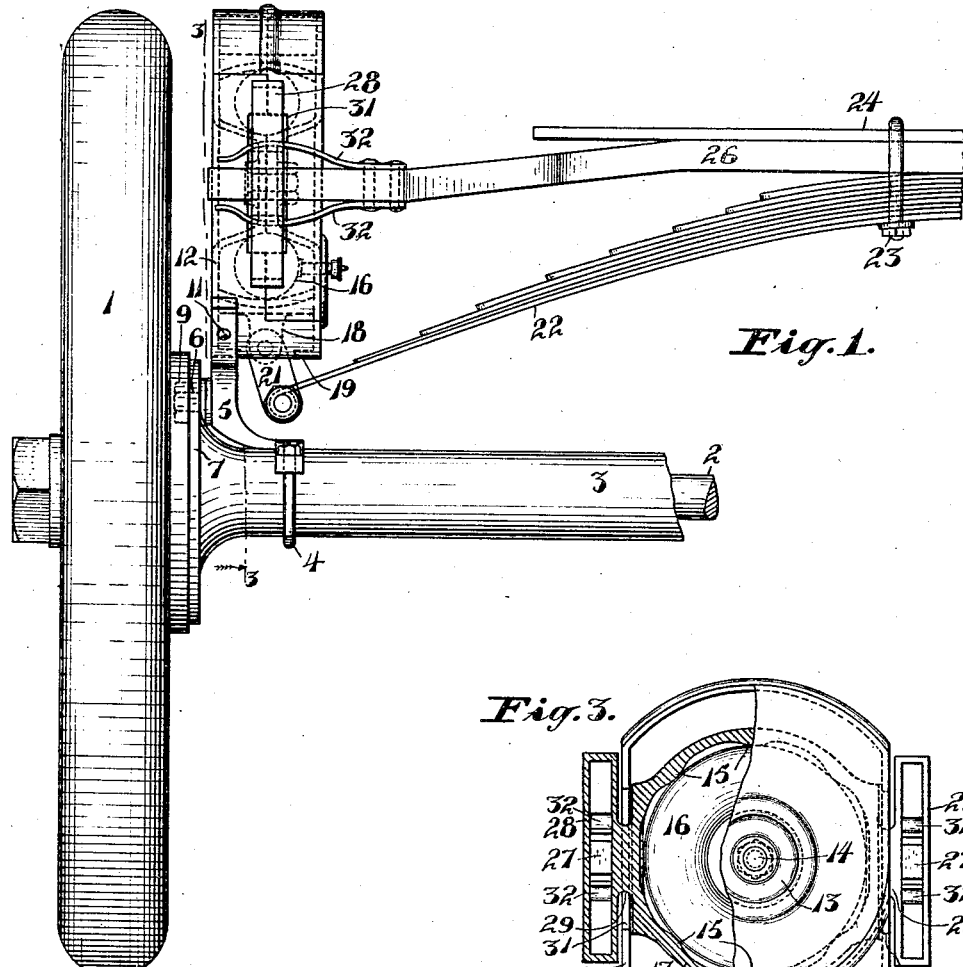
Figure 3:
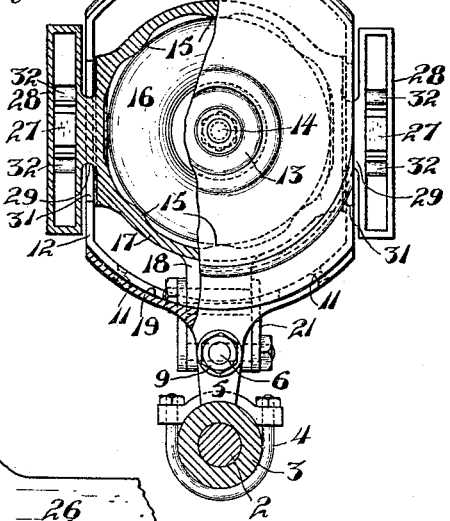
Figure 2:
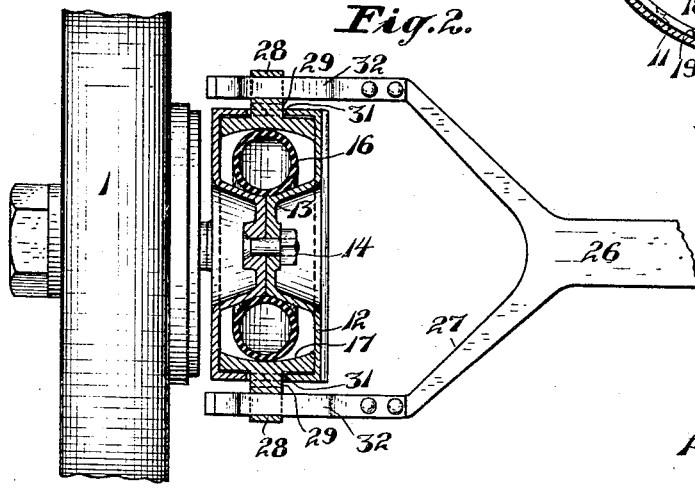

In the accompanying drawing, Figure 1 is a broken rear view of a portion of a car equipped with my invention; Fig. 2 is a broken plan view, partly in section, thereof; Fig. 3 is a section on the line 3—3 of Fig. 1.

Referring to the drawing, 1 indicates a wheel of a car and 2 the rear axle therefor. Secured around the housing 3 of said axle is a U-bolt 4 by which is supported on the axle the lower end of a bracket 5 from which a stud bolt 6 extends through the flange 7 on the outer end of the housing 3 for said axle, being secured to said flange by a nut 9. To said bracket 5 is riveted, as shown at 11, the bottom of a casing 12 having narrow vertical sides formed in two parts, each part being depressed at the center, as shown at 13, and said depressed portions being bolted together by a bolt 14 through the center of the housing. Around said depressed and connected portions of the two parts of the housing is an annular pneumatic tube 16, and supported by said tube is a vertically reciprocating carrier frame 17, the sides of said frame fitting snugly against the inner surfaces of the narrow vertical sides of the casing. I prefer that the inner surface of said frame should be in contact with the annular pneumatic tube 16 at a limited number of points 15 only, there being here shown three such points at the top of the inner surface of the frame and three at the bottom. Depending from the bottom of said frame is a hanger 18, which can extend through an opening 19 in the bottom of the casing, and is jointed to one end of a double link 21, of which the other end is jointed to a free end of a carriage spring 22 secured by a U-bolt 23 to a portion 24 of the body of the car. A transverse bar 26 is also secured by said U-bolt to said body, and said bar extends outward first horizontally and then slightly downward, being forked, as shown at 27, each end of the fork entering the elongated vertical guide 28 extending integrally from the corresponding side of the carrier frame and connected thereto by a neck 29, which can reciprocate vertically through a vertical slot 31 in the adjacent narrow vertical side of the casing. Secured to each fork member of the bar are upper and lower bow springs 32 which also extend through said vertical guides and, in the vertical movement of the carrier frame, are adapted to be impinged upon by the tops and bottoms of said guides respectively, and thereby resiliently limit the vertical movement of the vehicle body.

The advantages of the above construction will readily appear from the above description. The weight of the vehicle is not borne directly by the axles, but is transmitted by the carriage springs to the reciprocating frame and therefrom to the annular pneumatic tube, compressing said tube within the casing, and thereby transmitting the weight of the vehicle to said casing and thus to the axle housing and car wheels. At the same time this transmission permits of the car body moving vertically relative to the car wheels, said movement being resiliently arrested in either direction. The bar 26 forms a convenient and effective connection, independent of the carriage spring 22, to insure the forward or rearward movement of the car body with that of the car wheels, while permitting a vertical movement of said car body relative to said wheels.

I claim:—

1. In combination with an axle and a car body, a casing in two sections, one of which is supported by said axle, said sections having portions extending toward, and secured to, each other, a carrier vertically reciprocable in said casing, an annular pneumatic tube in said carrier, between the carrier and said central portions, and means for supporting said car body upon said carrier.

2. In combination with an axle and a car body, a casing supported by said axle, a carrier vertically reciprocable in said casing, an annular pneumatic tube in said carrier, the casing having a portion extending in the inner ring of the tube and upon which the tube can rest, said carrier having side guides extending outside the casing, means connected to the car body and guided by said side guides, and means for supporting said car body upon said carrier.

3. In combination with an axle and a car body, a casing supported by said axle, a carrier vertically reciprocable in said casing, an annular pneumatic tube in said carrier, the casing having a portion extending in the inner ring of the tube and upon which the tube can rest, said carrier having side guides extending outside the casing, a fork member connected to the car body and guided by said side guides, and means for supporting said car body upon said carrier.

4. In combination with an axle housing and a car body, a casing secured to said housing, a carrier vertically reciprocable in said casing, an annular pneumatic tube in said carrier, the casing having a portion extending in the inner ring of the tube and upon which the tube can rest, said carrier having side guides extending outside the casing, a fork member connected to the car body and guided by said side guides and resilient means for supporting said car body upon said carrier.

5. In combination with an axle housing and a car body, a casing secured to said housing, a carrier vertically reciprocable in said casing, an annular pneumatic tube in said carrier, the casing having a portion extending in the inner ring of the tube and upon which the tube can rest, said carrier having side guides extending outside the casing, means connected to the car body and guided by said side guides, a carriage spring connected to said body, and a flexible connection between said spring and carrier.

6. In combination with an axle housing and a car body, a casing secured to said housing, a carrier vertically reciprocable in said casing, an annular pneumatic tube in said carrier, the casing having a portion extending in the inner ring of the tube and upon which the tube can rest, said carrier having side guides extending outside the casing, a fork member connected to the car body and guided by said side guides, a carriage spring connected to said body, and a flexible connection between said spring and carrier.

7. In combination with an axle housing and a car body, a casing secured to said housing, a carrier vertically reciprocable in said casing, an annular pneumatic tube in said carrier, the casing having a portion extending in the inner ring of the tube and upon which the tube can rest, said carrier having side guides extending outside the casing, a fork member connected to the car body and guided by said side guides, a carriage spring connected to said body, a flexible connection between said spring and carrier, and upper and lower springs connected to each member of the fork and resiliently engaging the tops and bottoms respectively of the guides.

WILLIAM G. WOOD.

Copies of this patent may be obtained for five cents each, by addressing the "Commissioner of Patents, Washington, D. C."